Patented Apr. 18, 1933

1,904,663

UNITED STATES PATENT OFFICE

HERBERT NEWALL MORRIS, OF BROXBOURNE, ENGLAND, ASSIGNOR TO RUCEL LIMITED, OF LONDON, ENGLAND, A BRITISH COMPANY

IMPROVED ABRASIVE COATED MATERIAL

No Drawing. Application filed July 27, 1929, Serial No. 381,669, and in Great Britain May 30, 1928.

This invention relates to an improved abrasive coated material.

In this invention advantage is taken of the fact that rubber and cellulose, which expression includes one or more salts of cellulose, its alkyl derivatives, or esters, can be obtained in a true common solution, such for example as is described in British Patent No. 274,968 of April 30th 1926. Further it has been discovered that such a solution, apart from its known suitability for impregnating, proofing and binding of materials such as textile fabrics, has combined elastic, hardness and adhesive properties in proportions which render it particularly suitable for use in affixing abrasive substances in the manufacture of abrasive coated materials. By "common solution" is meant any solution of rubber and cellulose in which the two ingredients are wholly in solution and in which the solvent consists wholly or in part of a solvent which will dissolve both the ingredients.

The solution may vary in the proportion of rubber and cellulose respectively in its contents. A solution containing a mixture of a cellulose salt and rubber in the proportion of 90% cellulose and 10% rubber has been found to have the elasticity and hardness required for the treatment of most materials, but the proportions may be varied, cheaper, but generally less satisfactorily, results being obtained by increasing the relative proportion of rubber to cellulose. The material to be treated may be first dried and then painted or sprayed in one or more operations, hot or cold, or it may be impregnated or pickled in a hot solution, as in the case of articles made from pressed paper, cardboard, or from other fibrous material, wooden articles and the like.

The operation may take place at any temperature which does not damage the material treated, and which is below the boiling point of the solution. The boiling point of the solution may be varied by the selection of solvents used, as described, for example, in British Patent 274,968 above referred to. It is to be understood that this invention is applicable to any true common solution of rubber and cellulose salt or alkyl derivative or ester in solvents having low or high boiling points.

In the treatment of paper, cardboard, strawboard, and the like, the material may be treated on one side only by brushing, or it may be made to pass through a tank of the cold or hot solution and pass between or over rollers and/or cylinders which may be treated for quick drying. In this case also it is found that for treatment on one side only, greater efficiency is sometimes obtained by one application of a weak solution, as better penetration results and provides a foundation, that is to say, a common solution of rubber and cellulose salt, thinned with a solvent or solvents as above described is applied, and after drying, a second or third application of a stronger solution is applied which adheres to the foundation provided by the first application.

Paper, cardboard or strawboard, treated with the solution as above described, may be joined together, or attached to wood, paper, cardboard or other similar material by means of the concentrated solution, or by mixtures of the solution in more volatile solvents, with or without the addition of a loading resin, being a natural or synthetic resin or resins soluble in the same solvents.

Carborundum, garnet, emery, glass or other abrasive powder may be mixed with a concentrated solution and applied to cloth or paper, which produces, on drying, an abrasive cloth or paper which is not affected by water and which can, therefore, be used for cleaning paint-work, and for the finishing of paints, enamels and varnishes, and generally as waterproof speed-grits. The paper or cloth may also be treated one or more times with the solution, and before allowing to dry, the carborundum, garnet, emery, glass or other powder may be sprinkled on, and the excess of powder shaken off, and the whole then dried. If more perfect adhesion of the abrasive powder be required, a final treatment with the diluted solution may be necessary. If thorough water-proofing and acid or alkali proofing be required, the material is advantageously treated first with a dilute mixture of the solution with a volatile diluent, such as a hydro-carbon or hydrogenated hydrocarbon or mixture of hydrocarbons, hydrogenated hydrocarbons, butyl or other alcohol or ester, and/or acetone or like solvent. After drying, a second treatment may be applied by brush or spraying and either hot or cold.

Where possible, the surface to be treated should be heated to drive out moisture, or impregnation should take place at a temperature above the boiling point of water, as above described, but this is not essential if one side of the material only be treated, and the other side left untreated, so that any inherent moisture has an outlet.

What I claim is:—

1. An abrasive coated material comprising a backing sheet and a powdered abrasive material secured thereto by a homogeneous film containing rubber and cellulose in intimate association, at the same time attaching the abrasive, and filling and waterproofing the backing sheet.

2. The process of producing an abrasive-coated material comprising a backing sheet and a powdered abrasive material secured thereto by a homogeneous waterproofing and binding film containing rubber and cellulose in intimate association wherein the powdered abrasive material is mixed into a homogeneous solution of rubber and cellulose in a volatile solvent and the mixture sprayed on to the backing sheet.

In testimony whereof I have signed my name to this specification.

HERBERT NEWALL MORRIS.